United States Patent
Wears

(10) Patent No.: US 7,832,426 B2
(45) Date of Patent: Nov. 16, 2010

(54) PARABOLIC BONNET FOR THREE-WAY VALVE

(75) Inventor: William E. Wears, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 239 days.

(21) Appl. No.: 11/470,029

(22) Filed: Sep. 5, 2006

(65) Prior Publication Data

US 2008/0053545 A1    Mar. 6, 2008

(51) Int. Cl.
F16K 1/12    (2006.01)

(52) U.S. Cl. .............................. 137/625.38; 137/625.48; 251/118

(58) Field of Classification Search ............. 137/625.28, 137/625.33, 625.37, 625.38, 625.39, 625.48; 251/118, 122, 205, 333
See application file for complete search history.

(56) References Cited

U.S. PATENT DOCUMENTS

| | | | |
|---|---|---|---|
| 1,277,153 A * | 8/1918 | Sullivan | 137/625.35 |
| 1,442,782 A | 1/1923 | Braun | |
| 1,630,973 A * | 5/1927 | Schmidt | 137/625.33 |
| 3,960,358 A * | 6/1976 | Vollmer et al. | 251/61.5 |
| 4,011,892 A | 3/1977 | Kowalski | |
| 4,887,643 A | 12/1989 | Tomlin et al. | |
| 6,223,774 B1 * | 5/2001 | Fournier et al. | 137/637.2 |
| 6,394,135 B2 * | 5/2002 | Erickson et al. | 137/625.38 |
| 7,017,608 B2 * | 3/2006 | Erickson et al. | 137/625.38 |

FOREIGN PATENT DOCUMENTS

| | | |
|---|---|---|
| DE | 2358651 | 6/1975 |
| DE | 2457659 | 6/1976 |
| GB | 1428618 | 3/1976 |
| GB | 1517805 | 7/1978 |
| NL | 52942 | 7/1942 |

OTHER PUBLICATIONS

International Search Report for PCT/US2007/075720, mailed Dec. 20, 2007.
Written Opinion of the International Searching Authority for PCT/US2007/075720, mailed Dec. 20, 2007.
English-language translation of First Office Action for Chinese Application No. 200780031033.0, dated Jun. 9, 2010.

* cited by examiner

*Primary Examiner*—John Fox
(74) *Attorney, Agent, or Firm*—Marshall, Gerstein & Borun LLP

(57) ABSTRACT

A fluid control device including a valve body, a control member, and a one-piece bonnet. The valve body defines a flow path for a fluid. The control member is disposed in the valve body and adapted for displacement between at least a first position and a second position. The one-piece bonnet is coupled to the valve body and defines a protrusion. The protrusion extends at least partially into the flow path and is arranged to direct at least some of the fluid flowing along the flow path when the control member is disposed between the first position and the second position.

16 Claims, 6 Drawing Sheets

PRIOR ART

PARABOLIC BONNET FOR THREE-WAY VALVE

FIELD OF THE DISCLOSURE

The present disclosure relates to a fluid control device and, more particularly, to a fluid control device including a control member for controlling the flow of fluid and which is slidably disposed through a bonnet.

BACKGROUND

It is generally understood that in certain process applications more than two pipelines may sometimes be connected for flow-mixing or flow-splitting applications. For example, three pipelines may be connected to provide a general converging (flow-mixing) or diverging (flow-splitting) service. In such applications, a three-way valve may be used. Generally, three-way valves have three flow connections. For example, two flow connections may be inlets with one outlet for mixing inlet fluid flow, or there may be one inlet and two outlets for splitting outlet fluid flow.

With reference to FIG. 1, an example of a conventional three-way control valve 10 for a flow-splitting application will be described. The three-way control valve 10 includes a valve body 12, a control member 14, and an actuator 16 (shown in partial cross-section). The valve body 12 defines a flow path 18 for a fluid. As illustrated, this flow path 18 includes a single inlet 18a and two diverging outlets 18b, 18c. In an alternative three-way control valve (not shown), this flow path may include a single outlet and two converging inlets. In either configuration, the control member 14 is disposed within the valve body 12 and adapted for vertical displacement to selectively control the flow of the fluid through flow path 18. The actuator 16 (shown in partial cross-section) is operably coupled to the control member 14 to position the control member 14 in response to some signal or condition. In addition to these general elements, the conventional three-way control valve 10 illustrated in FIG. 1 includes a bonnet 20 disposed between the actuator 16 and the valve body 12. The bonnet 20 serves to couple the actuator 16 to the valve body 12 and provide support, as well as a seal, around the control member 14. Conventionally, the bonnet 20 includes a packing bore 22 for containing a packing assembly 24 to seal around the control member 14.

The control member 14 includes a stem 26 coupled to a valve plug 28. The stem 26 is slidably disposed through the bonnet 20 and operably connected to the actuator 16. The valve plug 28 is disposed within the flow path 18 of the valve body 12 such that it can selectively control the amount of fluid flowing through the flow path 18. The valve plug 28 includes ant upper seating surface 28a and a lower seating surface 28b. While in either an upper or lower seated position, the valve plug 28 must be capable of closing the outlet 18b or 18c to which the fluid is to be prevented from flowing. To achieve this, the conventional three-way valve assembly 10 illustrated in FIG. 1 further includes a cage 30 disposed in the valve body 12 having an upper valve seat 32a formed adjacent to an upper window 12a within the cage 30 and a lower valve seat 32b formed within a clamped seat 31 adjacent to the inlet 18a. The cage 30 is fixedly disposed in the flow path 18 of the valve body 12 and provides fluid control through the upper cage windows 12a to the upper outlet 18c and the lower cage windows 12b to the lower outlet 18b as the valve plug 28 moves along an axis defined by the valve stem 26. To restrict flow from the lower outlet 18b depicted in FIG. 1, the lower seating surface 28b of the valve plug 28 sealingly engages the seating surface 32b of the clamped seat 31 when in the lower seated position. Similarly, to restrict flow from the upper outlet 18c depicted in FIG. 1, the upper seating surface 28a of the valve plug 28 sealingly engages the upper seating surface 32a of the valve cage 28 when in the upper seated position.

It should be appreciated by one of ordinary skill in the art that the actuator 16 is adapted to move the valve plug 28 between a lower seated position and an upper seated position in such a manner that flow may occur in various proportions through both the lower and the upper outlets 18b, 18c when the valve plug 28 is in an intermediate position between the upper and lower valve seats 32a, 32b of the cage 30 and the clamped seat 31 respectively.

SUMMARY

One aspect of the present disclosure includes a bonnet for a fluid control device. The bonnet includes a substantially cylindrical internal surface, a flange, and a protrusion. The substantially cylindrical internal surface defines a through-bore for receiving a control member. The flange is adapted to be coupled between an actuator and a valve body. The protrusion directs the flow of fluid through the fluid control device.

According to another aspect, the protrusion extends substantially coaxially with the through-bore.

According to another aspect, the protrusion includes a substantially parabolic cross-sectional portion.

According to another aspect, the protrusion includes a substantially frustoconical cross-sectional portion.

According to yet another aspect, the protrusion includes an outer surface adapted to be seated against by a valve plug coupled to the control member for providing a seal.

According to still another aspect, the protrusion is adapted to extend at least partially into the valve body.

According to still yet another aspect, the substantially cylindrical surface further defines a packing cavity for receiving packing to seal the control member.

DETAILED DESCRIPTION OF THE DISCLOSURE

Figure 1:
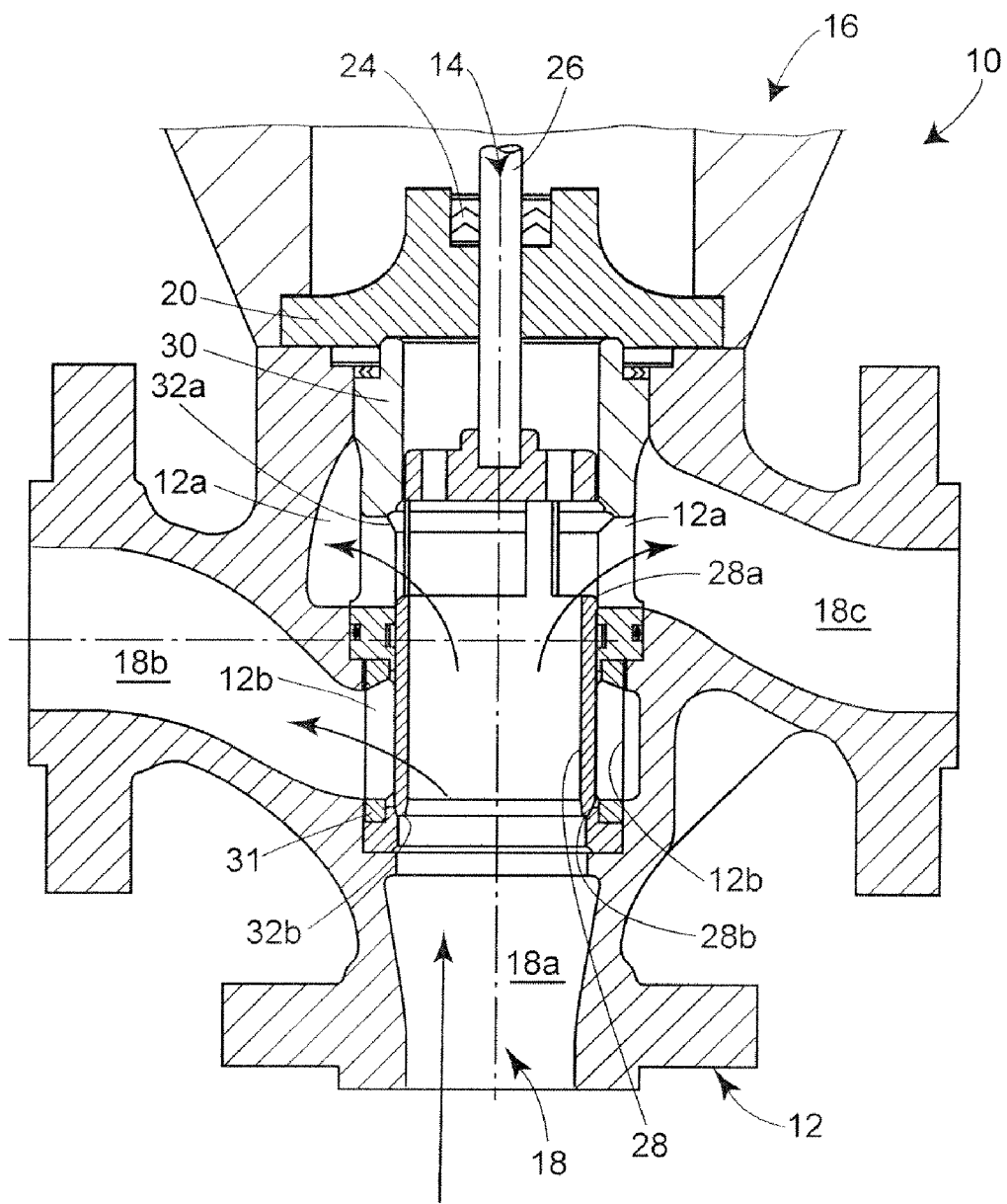
FIG. 1 is a cross-sectional side view of a conventional three-way valve assembly including a valve plug disposed in an intermediate position.
Figure 2:
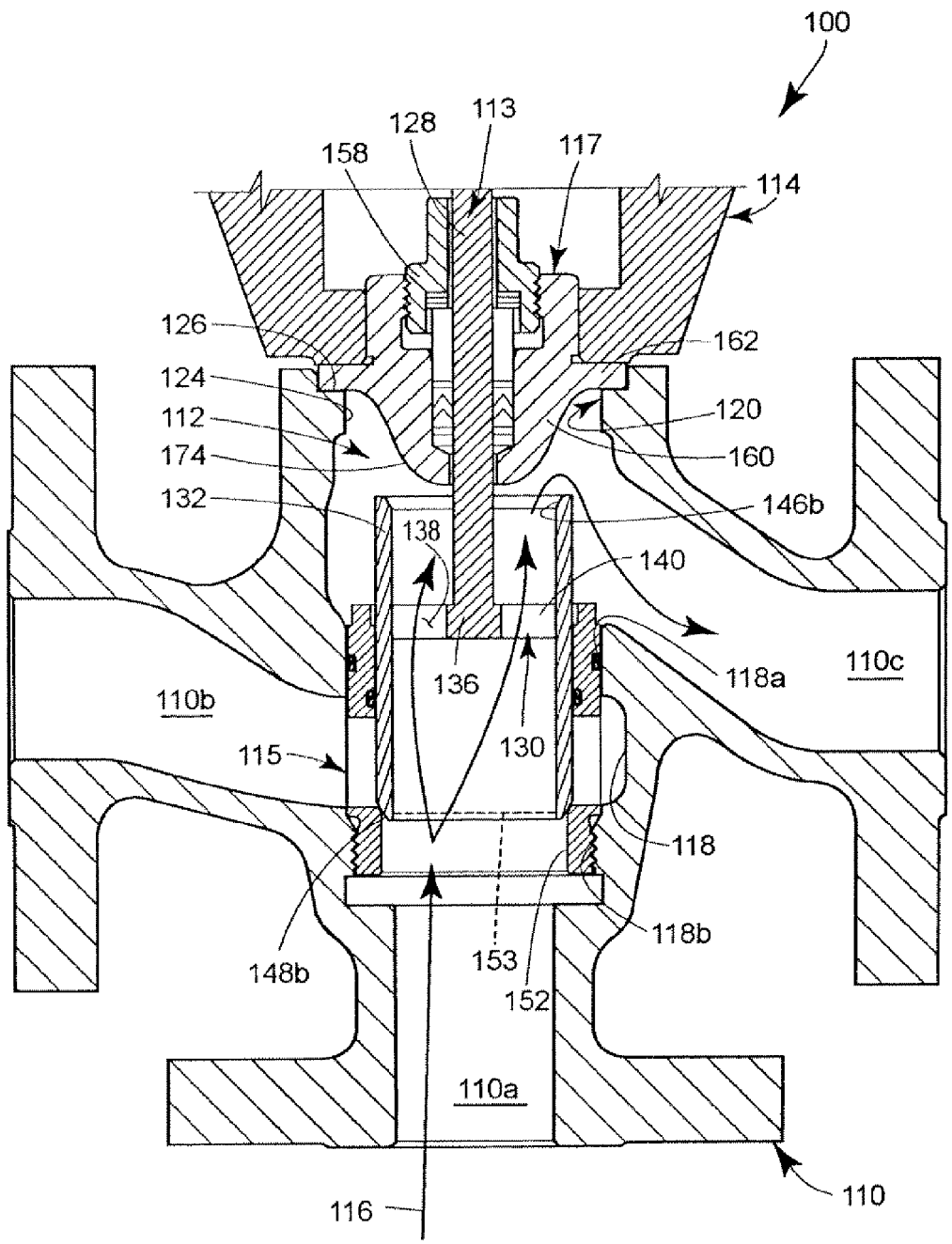
FIG. 2 is a cross-sectional side view of a three-way valve assembly including a bonnet constructed in accordance with the principles of the present disclosure and a valve plug in bottom seated position.
Figure 3:
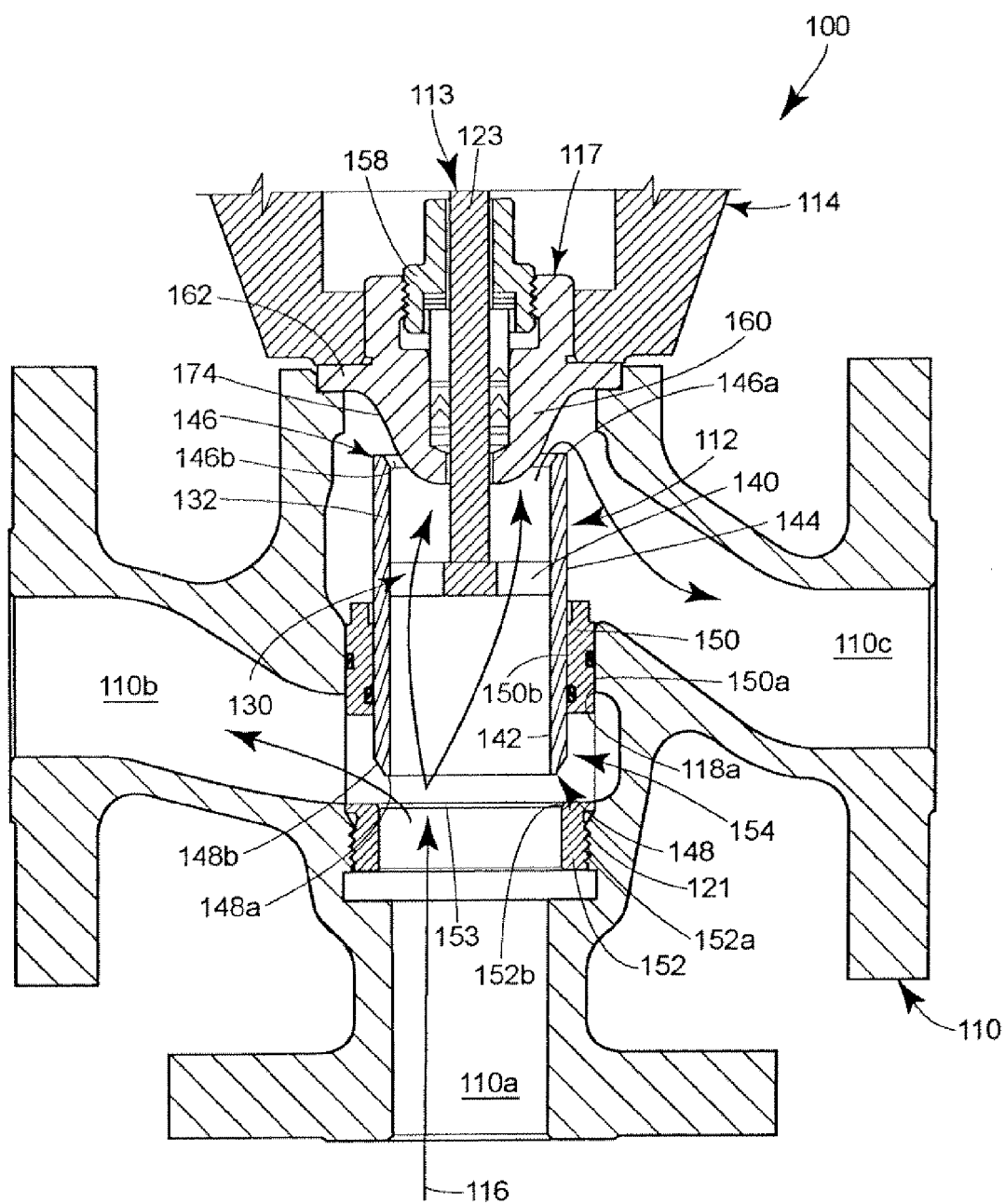
FIG. 3 is a cross-sectional side view of the three-way valve assembly of FIG. 1 with the valve plug in an intermediate position.
Figure 4:
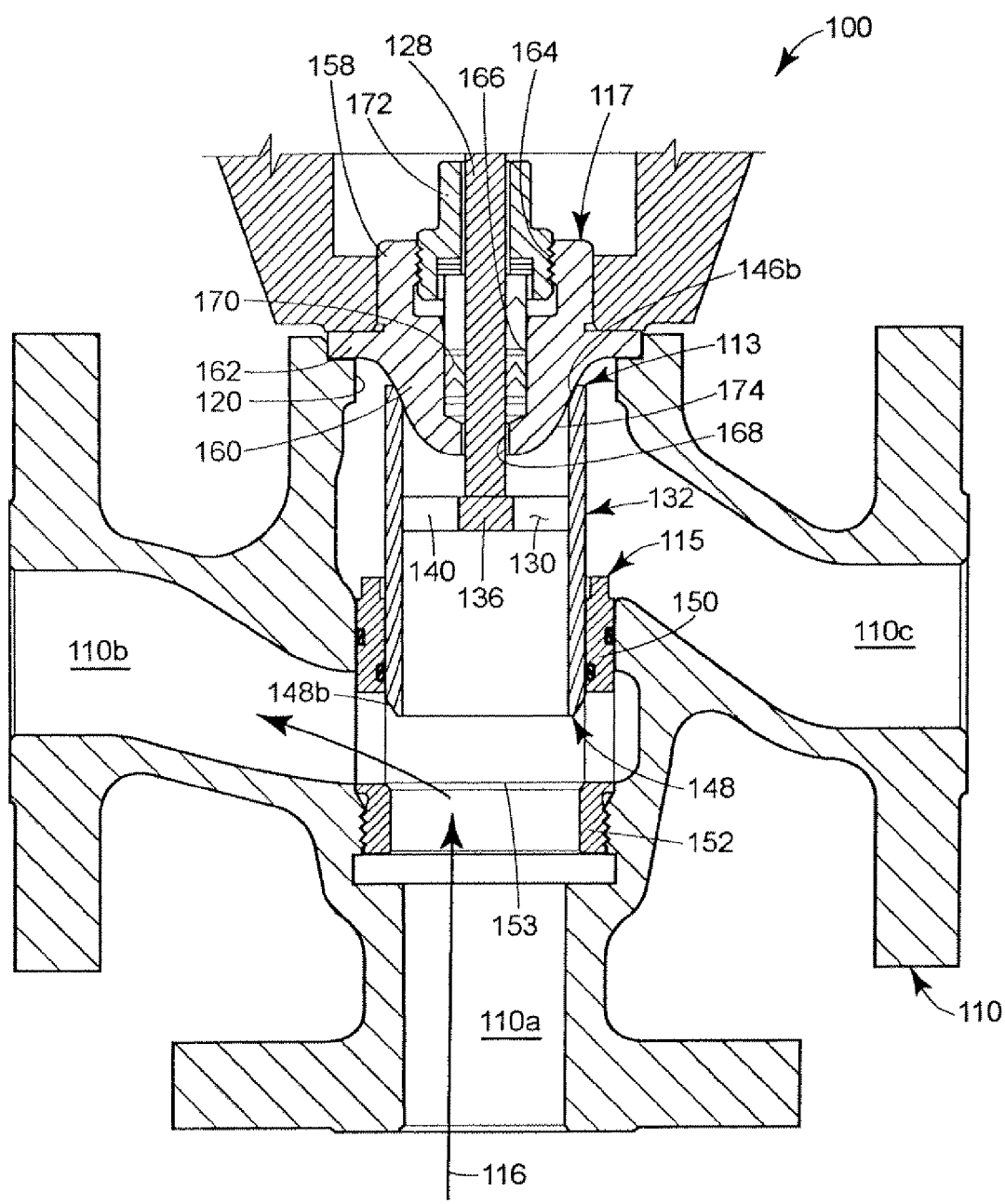
FIG. 4 is a cross-sectional side view of the three-way valve assembly of FIG. 1 with the valve plug in a top seated position.

FIGS. 2-4 depict a fluid control device constructed in accordance with the principles of the present disclosure and including a three-way control valve assembly 100 for a flow-splitting application. Generally, the three-way control valve assembly 100 includes a valve body 110, a trim assembly 112, and an actuator 114 (shown in partial cross-section). The valve body 110 defines an inlet 110a, a first outlet 110b, and a second outlet 110c. The actuator 114 is operably coupled to drive a control member 113 of the trim assembly 112 between one or more positions within the valve body 110 for selectively directing the flow of a fluid, which may be represented by the arrows 116, between the inlet 110a and either or both the outlets 110b, 110c, as will be described in much greater detail below.

With continued reference to FIGS. 2-4, one form of the three-way control valve assembly 100 will be described in detail. The valve body 110, as mentioned, includes an inlet 110a, a first outlet 110b, and a second outlet 110c. Additionally, the valve body 110 includes a lower passageway 118 and an upper passageway 120. The lower passageway 118 is centrally disposed within the valve body 112 and provides for fluid communication between each of the inlet 110a, the first outlet 110b, and the second outlet 110c. The lower passageway 118 includes a generally cylindrical opening in the valve body 110 defining an upper cylindrical surface 118a and a lower cylindrical surface 118b. In the form depicted in FIGS. 2-4, the lower cylindrical surface 118b includes internal threads. The upper passageway 120 is disposed directly opposite the lower passageway 120 from the inlet 110a. The upper passageway 120 includes a generally cylindrical opening 124 and a stepped shoulder 126. The opening 124 and shoulder 126 are coupled to the actuator 114, which drives the control member 113 of the trim assembly 112.

The trim assembly 112, as mentioned, includes the control member 113 and also includes a cage 115 and a bonnet 117. The cage 115 serves to maintain proper alignment of the control member 113 during operation. The control member 113 includes a stem 128, a webbed portion 130, and a valve plug 132. The stem 128 includes a substantially cylindrical rod operably coupled to the actuator 114 for vertical displacement relative to the valve body 110. Although not depicted in detail, the actuator 114 may include generally any type of actuator capable of displacing the control member 114 via the stem 128. For example, the actuator 114 may include a screw-drive actuator, a rack and pinion actuator, a diaphragm actuator, or any other type of actuator. Below the actuator 114, the stem 128 extends through the upper passageway 120 of the valve body 110 and terminates at the webbed port ion 130. The webbed portion 130 includes a hub 136 and a plurality of webs 138. The webs 138 extend radially outward from the hub 136 and define a plurality of openings 140, as depicted most clearly in FIG. 4. The openings 140 allow for the passage of fluid 116 through the valve plug 112, as depicted by the arrows in FIGS. 2 and 3. The webs 138 terminate at the valve plug 132.

As identified more clearly in FIG. 3, the valve plug 132 includes a hollow substantially cylindrical member having an inner surface 142, an outer surface 144, a top rim 146, and a bottom rim 148. The top and bottom rims 146, 148 define open top and bottom ends of the valve plug 132. The top rim 146 includes a top surface 146a and a frustoconical surface 146b, which are identified in FIG. 3. The frustoconical surface 146b of the top rim 146 is disposed inward of the outer surface 144 and converges inward from the top surface 146a to the inner surface 142. The bottom rim 148 similarly includes a bottom surface 148a and a frustoconical surface 148b. The frustoconical surface 148b of the bottom rim 148 is disposed outward of the inner surface 142 and converges inward from the outer surface 144 to the bottom surface 148a.

The cage 115 includes a hollow generally cylindrical member, which, as mentioned above, slidably receives the control member 113 and, more specifically, the valve plug 132. The cage 115 includes an upper portion 150, a lower portion 152, and a plurality of cage windows 154. The cage windows 154 are defined between the upper and lower portions 150, 152. The cage windows 154 enable the flow of fluid to pass through the valve plug 132 according to a position of the valve plug 132 relative to the first outlet 110b and second outlet 110c, as will be described in more detail below. The upper portion 150 of the cage 115 includes an external surface 150a and an internal surface 150b. The external surface 150a is in sealed engagement with the upper cylindrical surface 118a of the lower passageway 118 of the valve body 110. The internal surface 150b of the upper portion 150 is in sliding relationship with the valve plug 132 of the control member 113 to assist in maintaining the axial alignment thereof. The lower portion 152 of the cage 115 includes an external surface 152a and an internal surface 152b. The internal surface 152b includes a frustoconical seating surface 153. The frustoconical seating surface 153 is adapted to be abutted by the frustoconical surface 148b of the bottom rim 148 of the valve plug 132, as will be described in more detail below. The external surface 152a includes external threads to engage the internal threads 121 of the lower cylindrical surface 118a of the lower passageway 118 of the valve body 110. This threaded engagement secures the cage 115 within the valve body 110, thereby enabling the control member 114 to move relative to the remainder of the trim assembly 112 including the bonnet 117.

As identified more clearly in FIG. 4, the bonnet 117 is a one-piece member including an upper cylindrical portion 158, a lower contoured portion 160, and a radial flange portion 162. The bonnet 117 defines a threaded cavity 164, a packing cavity 166, and a through-bore 168 in communication with each other. The threaded cavity 164 is disposed in the upper cylindrical portion 158. The packing cavity 166 and through-bore 168 are disposed in the lower contoured portion 160. The stem 128 of the control member 113 extends through the bonnet 117 from the webbed portion 130 to the actuator 114. The packing cavity 166 contains packing 170 that provide a seal around the stem 128 such that fluid 116 in the valve body 110 does not leak through the bonnet 117 to the actuator 114. The threaded cavity 166 contains a packing nut 172 that threadingly engages the threaded cavity 166 to maintain the packing 170 in the packing cavity 168.

The lower contoured portion 160 of the bonnet 117 includes a protrusion-shaped body having a parabolically shaped cross-section defined by an outer seating surface 174. The lower contoured portion 160 extends into the valve body 110 beyond the upper passageway 120. The outer seating surface 174 is adapted to be abutted by the frustoconical surface 146b on the top rim 146 of the valve plug 132, as is illustrated in FIG. 4 and which will be described in more detail with respect to the operation of the control valve assembly 100.

Specifically, during operation, the actuator 114 is operable to displace the control member 112 including the stem 128 and the valve plug 132 relative to the valve body 110, cage 115, and bonnet 117 to control the flow of the fluid 116. The actuator 114 is operable to move the control member 113 between a lower seated position, which is illustrated in FIG. 2, an intermediate position, which is illustrated in FIG. 3, and an upper seated position, which is illustrated in FIG. 4. While in the lower seated position illustrated in FIG. 2, the frustoconical surface 148b on the lower rim 148 of the valve plug 132 sealingly engages the frustoconical seating surface 153 on the lower portion 152 of the cage 115. In the form depicted, the frustoconical surface 148b of the lower rim 148 of the valve plug 132 and the frustoconical seating surface 153 on the cage 115 are disposed substantially parallel to each other. The rim 148 and cage 115 therefore provide a substantially two-dimensional fluid-tight seal. Accordingly, in this position, the valve plug 132 prevents the flow of fluid 116 into the first outlet 110b. Therefore, fluid 116 flows in the inlet 110a, up through the hollow valve plug 132 including through the openings 140 in the webbed portion 130, beyond the top rim 146, and out the second outlet 110c as indicated by the arrows in FIG. 2. As the fluid 116 passes through the top rim 146, it deflects off of the lower contoured portion 160 of the bonnet 117 and fluidly disperses into the second outlet 110c. The lower contoured portion 160 of the bonnet 117 therefore serves to control the flow of the fluid 116 along its flow path into the second outlet 110c.

Alternatively, as depicted in FIG. 4, while the control member 114 is in the upper seated position, the frustoconical surface 146b on the upper rim 146 of the valve plug 132 sealingly engages the outer seating surface 174 of the lower contoured portion 160 of the bonnet 117. The parabolic cross-sectional shape of the lower contoured portion 160 optimizes the sealing engagement between the outer seating surface 174 and the rim 146. In the form depicted, the outer seating surface 174 is disposed substantially parallel to the frustoconical surface 146b on the tipper rim 146 at the point of engagement. The in 146 and bonnet 117 therefore provide a substantially two-dimensional fluid-tight seal. Accordingly, in this position, the valve plug 132 seals with the bonnet 117 and prevents the flow of fluid 116 into the second outlet 110c. Additionally, the valve plug 132 raises at least partly above the cage windows 154, thereby directing the fluid 116 up through the lower portion 152 of the cage 115, through at least one of the cage windows 154, and into the first outlet 110b.

While the bottom rim 148 of the valve plug 132 has been disclosed herein as including a frustoconical surface 148b adapted to sealingly engage a frustoconical seating surface 153 on the cage 115 and the top rim 146b has been disclosed as including a frustoconical surface 146b adapted to sealingly engage the outer seating surface 174 of the bonnet 117, an alternate form of the valve assembly 100 may not include frustoconical surfaces. For example, one alternate form may include rims 146, 148 having only axial end surfaces 146a, 148a. So configured, the rims 146, 148 would provide ring seals with the respective bonnet 117 and frustoconical seating surface 153 of the cage 115. Such ring seals may be substantially one-dimensional. In another alternate form, the rims 146, 148 may include bull-nosed surfaces adapted to sealingly engage the bonnet 117 and cage 115 or any other shape capable of providing the one or two-dimensional seal between the aforesaid components to direct the fluid flow as desired for the given application.

FIG. 3 depicts the control member 113 in an intermediate position between the tipper seated position illustrated in FIG. 4 and the lower seated position illustrated in FIG. 2. While in this intermediate seated position, both the top rim 146 and the bottom rim 148 are disengaged from the outer seating surface 174 of the bonnet 117 and the frustoconical seating surface 153 of the cage 115, respectively. Accordingly, after the fluid 116 flows in the inlet 110a, a portion of it travels up through the hollow valve plug 132 including through the openings 140 in the webbed portion 130, beyond the top rim 146, and out the second outlet 110c. Identical to that described above with respect to FIG. 2, as the fluid 116 passes through the top rim 146, it deflects off of the lower contoured portion 160 of the bonnet 117 and fluidly disperses into the second outlet 110c. The remainder of the fluid 116 travels up through the lower portion 152 of the cage 115, through at least one of the cage windows 154, and into the first outlet 110b. The position of the valve plug 132 and, more specifically, the top rim 146 of the valve plug 132 relative to the bonnet 117, controls the amount of the fluid 116 that flows into the second outlet 110c. Similarly, the position of the valve plug 132 and, more specifically, the bottom rim 148 of the valve plug 132 relative to the frustoconical seating surface 153 of the cage 115, controls the amount of fluid 116 that flows through the cage window 115 into the first outlet 110b.

Figure 5:
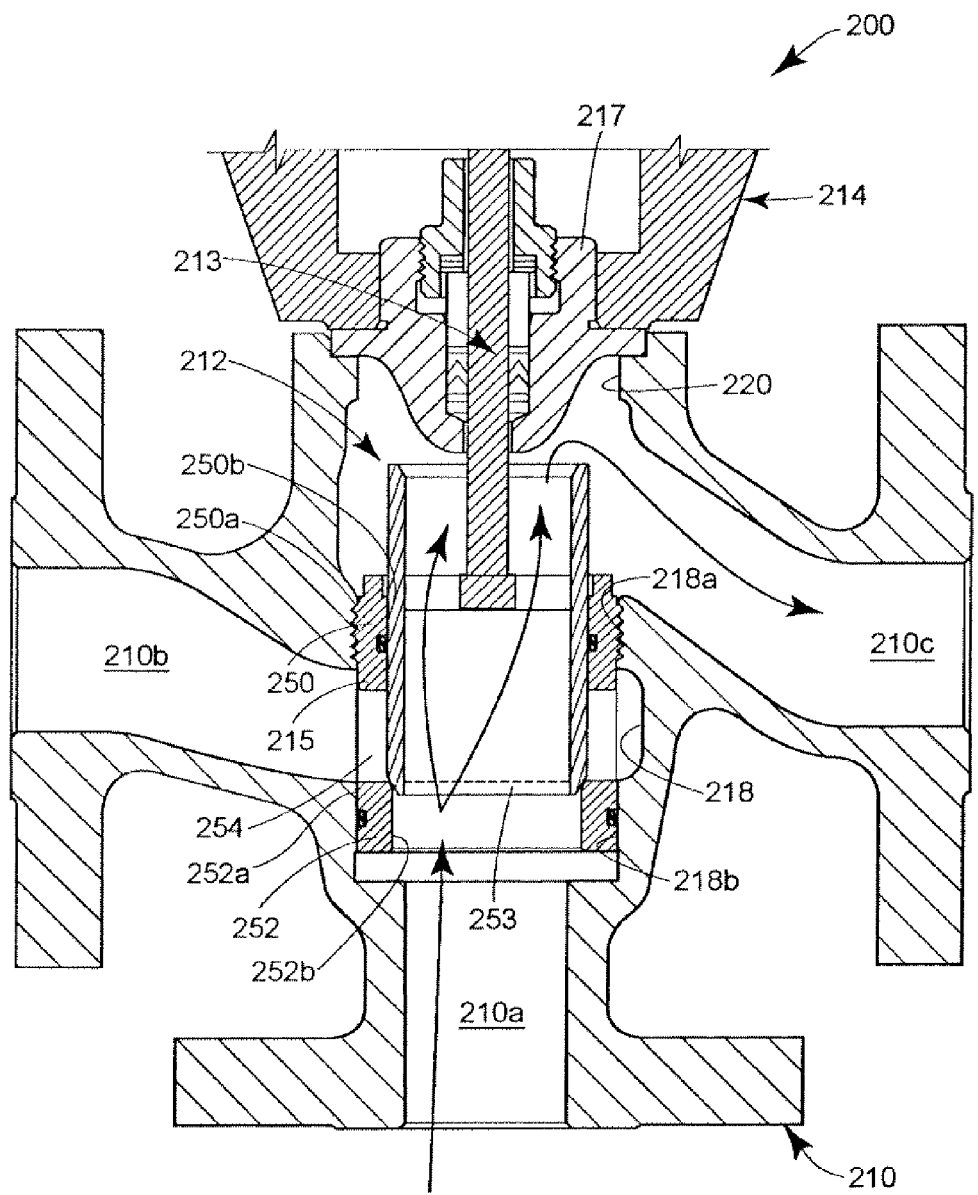
FIG. 5 is a cross-sectional side view of a three-way valve assembly including a bonnet constructed in accordance with the principled of the present disclosure including an alternate cage configuration.

FIG. 5 depicts an alternate form of a three-way valve assembly 200 constructed according to the principles of the present disclosure. The three-way-valve assembly 200 is substantially identical to the three-way valve assembly 100 described above with reference to FIGS. 2-4 and therefore like components will be identified by like reference numerals increased by one hundred.

The three-way valve assembly 200 includes a valve body 210, a trim assembly 212, and an actuator 214. The primary distinction between the form of the three-way valve assembly 200 depicted in FIG. 5 with that depicted in FIGS. 2-4 is the cooperation and arrangement of the trim assembly 212 and valve body 210 and therefore only a detailed explanation of these components will be provided.

The valve body 210 includes an inlet 210a, a first outlet 210b, and a second outlet 210c. Additionally, the valve body 210 includes a lower passageway 218 and an upper passageway 220. The lower passageway 218 is centrally disposed within the valve body 212 and provides for fluid communication between each of the inlet 210a, the first outlet 210b, and the second outlet 210c. The lower passageway 218 includes a generally cylindrical opening in the valve body 210 defines an upper cylindrical surface 218a and a lower cylindrical surface 218b In the form depicted in FIG. 5, the upper cylindrical surface 218a includes internal threads.

The trim assembly 212 includes a control member 213, a cage 215, and a bonnet 217. The control member 213 and bonnet 217 are identical to the control member 113 and bonnet 117 described above. The cage 215 includes a hollow generally cylindrical member, which slidably receives the control member 213. The cage 215 includes an upper portion 250, a lower portion 252, and a plurality of cage windows 254. The cage windows 254 are defined between the upper and lower portions 250, 252. The cage windows 254 enable the flow of fluid to pass between the inlet 210a and the first outlet 210b. The lower portion 252 of the cage 215 includes an external surface 252a and an internal surface 252b. The internal surface 252b includes a frustoconical seating surface 253 identical to that disclosed with reference to FIG. 2-4. The upper portion 250 of the cage 215 includes an external surface 250a and an internal surface 250b. The internal surface 250b is in sliding relationship with the control member 214 to assist in maintaining the axial alignment thereof. The external surface 250a includes external threads to engage the internal threads of the upper cylindrical surface 218b of the lower passageway 218 of the valve body 210. This threaded engagement secures the cage 215 within the valve body 210, thereby enabling the control member 214 to move relative to the remainder of the trim assembly 212 including the bonnet 217. It should therefore be appreciated that subsequent to assembly, the three-way valve assembly 200 operates substantially identically to the three-way valve assembly 100 described above and thus, an additional explanation will not be provided.

Figure 6:
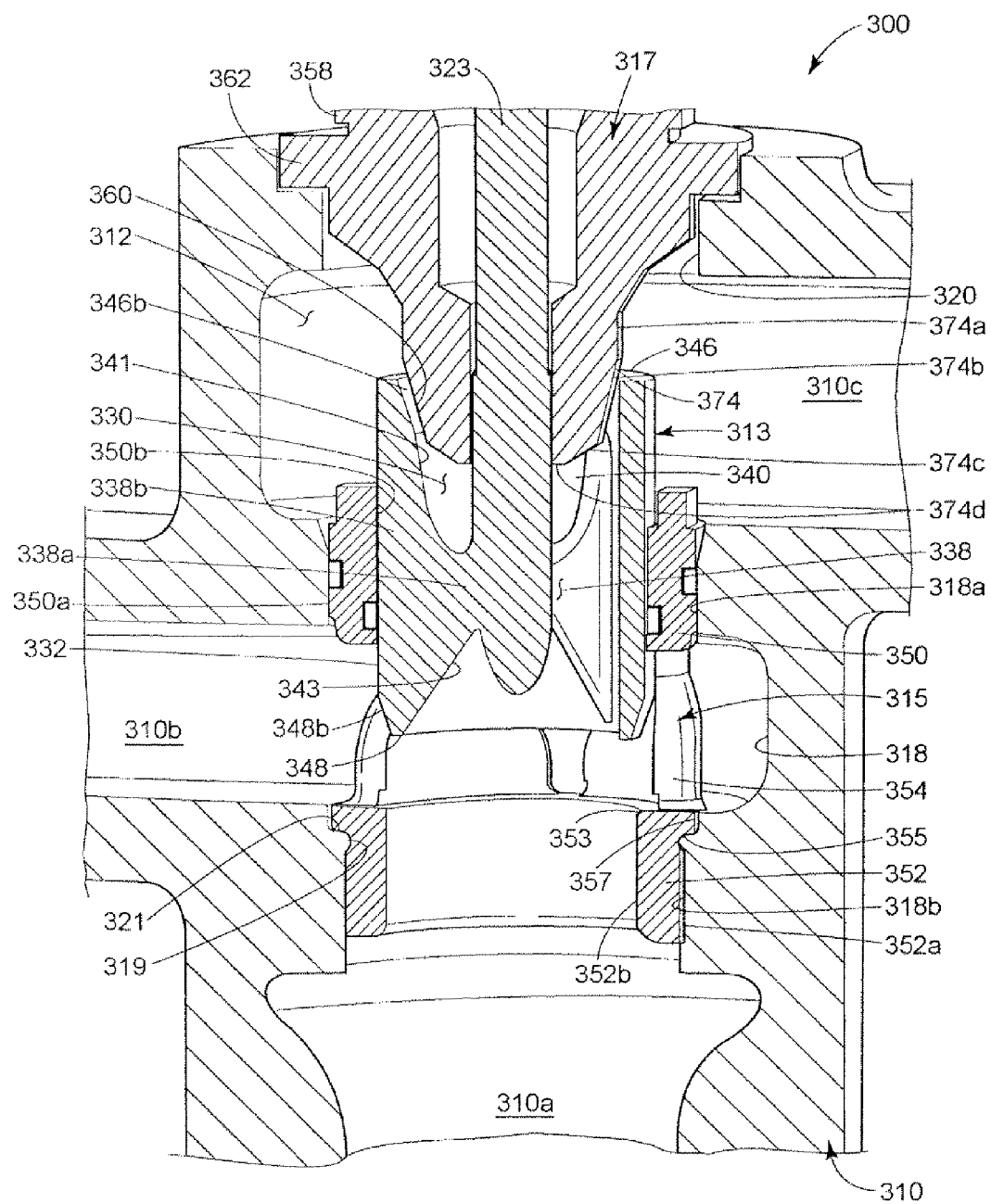
FIG. 6 is a partial fragmentary cross-sectional side view of a three-way valve constructed in accordance with the principles of the present disclosure including an alternate bonnet and valve plug configuration.

FIG. 6 depicts a partial fragmentary cross-sectional view of another alternate form of a three-way valve assembly 300 in accordance with the principles of the present disclosure. The three-way valve assembly 300 includes a valve body 310 and a trim assembly 312. It should be appreciated that while the three-way valve assembly 300 depicted in FIG. 6 does not expressly include an actuator, it could be adapted to be coupled to most any type of actuator to suit any desired application.

As mentioned, the three-way valve assembly 300 includes a valve body 310 and a trim assembly 312. The valve body 310 includes an inlet 310a, a first outlet 310b, and a second outlet 310c. Additionally, the valve body 310 includes a lower passageway 318 and an upper passageway 320. The lower passageway 318 is centrally disposed within the valve body 312 and provides for fluid communication between each of the inlet 310a, the first outlet 310b, and the second outlet 310c. The lower passageway 318 includes a generally cylindrical opening in the valve body 310 defining an upper cylindrical surface 318a and a lower cylindrical surface 318b. In the form depicted in FIG. 6, the lower cylindrical surface 318b includes a lip 319 and a shoulder 321. The lip 319 extends radially inward of the lower cylindrical surface 318b of the lower passageway 318.

The trim assembly 312, similar to those described above, includes a control member 313, a cage 315, and a bonnet 317. The control member 313 includes a one-piece integral body having a stem 323, a webbed portion 330, and a valve plug 332. The stem 323 is an elongated substantially cylindrical rod adapted to be drivingly coupled to an actuator (not shown). The webbed portion 330 includes a plurality of webs 338 defining a plurality of openings 340. The webs 338 extend radially between the stem 323 and the valve plug 323. The valve plug 323 is slidingly disposed in the cage 315 for controlling the flow of fluid through the three-way valve assembly 300 in a manner similar to that described above with reference to FIGS. 2-4. More specifically, the valve plug 332 in combination with the openings 340 between the webs 338 of the webbed portion 330 control the flow of fluid. The valve plug 323 includes a substantially cylindrical body having a top rim 346 and a bottom rim 348. Similar to the valve plugs 132, 232 described above with reference to FIGS. 2-5, the top rim 346 of the valve plug 323 includes an inner frustoconical surface 346b and the bottom rim 348 includes an outer frustoconical surface 348b. The inner and outer frustoconical surfaces 346b, 348b are adapted to sealingly engage the bonnet 317 and cage 315, respectively, similar to that described above.

As depicted in cross-section in FIG. 6, the webs 338 include fairly complex geometries, thereby defining openings 340 having fairly complex geometries. In the form depicted, the geometries are adapted to control the flow of fluid therethrough. Specifically, the webs 338 and therefore the openings 340 are adapted to streamline the flow of fluid, thus providing for an efficient three-way valve assembly 300. The webs 338 each include inner radial portions 338a and outer radial portions 338b. The inner radial portions 338a are integrally connected to the stem 323. The outer radial portions 338b are integrally connected to the valve plug 323. The inner radial portions 338a have axial dimensions substantially smaller than axial dimensions of the outer radial portions 338b. Thus, as shown in FIG. 6, the webs 338 each have generally triangular vertical cross-sections partially defined by an upper surface 341 and a lower surface 343. The upper surface 341 includes a concave surface extending circumferentially between adjacent webs 338. The lower surface 343 includes a partial frustoconical surface extending between adjacent webs 338. Accordingly, the webs 338 define the openings 340 as having generally triangular vertical cross-sections defined between the stem 323, the valve plug 332, and the upper and lower surfaces 341, 343 of the webs 338. Thus, it should be appreciated that the angles of the concave and frustoconical upper and lower surfaces 341, 343, respectively, enhance fluid flow through the control member 313 by reducing interference and promoting laminar flow.

Similarly, the bonnet 317 is configured to control the flow of fluid through the valve body 310. The bonnet 317 is a one-piece member including an upper cylindrical portion 358, a lower contoured portion 360, and a radial flange portion 362. The stem 323 of the control member 313 extends through the bonnet 317 from the webbed portion 330 to and actuator (not shown), which is located opposite the upper cylindrical portion 358. Although shown in fragmentary cross-section, the upper cylindrical portion 358 is identical to that described above in that it is adapted to threadingly receive a packing nut for maintaining packing within the bonnet 317.

The lower contoured portion 360 of the bonnet 317 includes a protrusion-shaped body including an outer seating surface 374. The outer seating surface 374 includes an upper portion 374a, an intermediate portion 374b, an end portion 374c, and an end face 374d. The upper portion 374a is substantially cylindrical. The intermediate portion 374b is substantially frustoconical and converges from the upper portion 374a toward the end portion 374c. The end portion 374c is also substantially frustoconical and converges from the intermediate portion 374b toward the end face 374d. The intermediate portion 374b converges at an angle less than an angle at which the end portion 374c converges. Therefore, a cross-section of the lower contoured portion 360, which is defined by the shape of the outer seating surface 374 just described, generally reflects a parabola; however, it is constructed of generally linearly converging portions. Accordingly, during operation, the inner frustoconical surface 346b on the top rim 346 of the valve plug 323 can selectively sealingly engage the seating surface 374 of the bonnet 317. More specifically, FIG. 6 depicts that the inner frustoconical surface 346b sealingly engages the intermediate portion 374b of the seating surface 374 to provide a substantially two-dimensional seal therewith.

When the valve plug 332 is disengaged from the bonnet 317, however, fluid flows in the inlet 310a and through the webbed portion 330 of the control member 313 to the second outlet 310c. While passing through the top rim 346 of the valve plug 332, the fluid deflects off of the seating surface 374. The generally contoured shaped of the seating surface 374 of the bonnet 317 assists in streamlining the flow of the fluid by providing a deflection surface that is generally parallel to the flow. This reduces interference and promotes laminar flow and provides for an efficient three-way valve assembly 300.

Similar to the valve assemblies 100, 200 described above the cage 315 of the three-way valve assembly 300 depicted in FIG. 6 slidably receives the valve plug 323 to assist in maintaining the axial alignment of the control member 313. In more detail, the cage 315 includes a hollow generally cylindrical member having an upper portion 350, a lower portion 352, and a plurality of cage windows 354. The cage windows 354 are defined between the upper and lower portions 350, 352. The cage windows 354 enable the flow of fluid to pass between the inlet 310a and the first outlet 310b. The lower portion 352 of the cage 315 includes an external surface 352a and an internal surface 352b. The internal surface 352b includes a seating surface 353. The external surface 352a includes annular recess 355 and a flange 357. The annular recess 355 receives the lip 319 on the lower cylindrical surface 318b of the lower passageway 318 of the valve body 310. The flange 357 axially engages the shoulder 321 on the lower cylindrical surface 318b of the lower passageway 318 of the valve body 310. The engagement between the annular recess 355 and lip 319 as well as the engagement between the shoulder 321 and flange 357 secures the cage 315 within the lower passageway 318.

The upper portion 350 of the cage 315 includes an external surface 350a and an internal surface 350b. The internal surface 350b is in sliding relationship with the control member 313 to assist in maintaining the axial alignment thereof. The external surface 350a is in sealing engagement with the upper cylindrical surface 318a of the lower passageway 318. It should therefore be appreciated that subsequent to assembly, the three-way valve assembly 300 depicted in FIG. 6 operates substantially identically to the three-way valve assemblies 100, 200 described above and thus, an additional explanation will not be provided.

It should be appreciated that the foregoing detailed descriptions of the various forms of valve assemblies are merely examples and that the present invention is not limited thereto but includes additional variations thereon. For example, while the above-described forms of the three-way valve assembly have been disclosed as including generally parabolically shaped bonnets, alternate forms of the three-way valve assembly may include hemispherical bonnets, irregularly shaped bonnets or any other geometry of bonnet intended to serve the principles of the present disclosure. Furthermore, while the forms of the disclosure depicted in FIGS. 2-5 have been disclosed as including cages 115, 215 threadingly coupled to the respective valve bodies 110, 210, alternate forms of those valve assemblies 100, 200 may include cages 115, 215 coupled to the valve bodies 110, 210 by means of snap-fit engagement similar to that depicted and described with reference to FIG. 6, or by adhesive, interference fit, or any other device capable of serving the principles of the present disclosure.

What is claimed is:

1. A fluid control device, comprising:
   a valve body defining a flow path for a fluid;
   a hollow control member disposed in the valve body and adapted for displacement between at least a first position and a second position; and
   a bonnet coupled to the valve body and defining a protrusion extending into the flow path and arranged to direct at least some of the fluid flowing along the flow path when the control member is disposed between the first position and the second position, wherein the protrusion includes a continuously curved convex protrusion, the entirety of the curved convex protrusion being rigid and having a substantially parabolic cross-section, a first portion of the curved convex protrusion having a diameter that is greater than an inner diameter of the hollow control member and a second portion of the curved convex protrusion having a diameter that is less than the inner diameter of the hollow control member such that when the control member is in the second position, the control member engages the curved convex protrusion and the second portion of the curved convex protrusion is received by the control member and the first portion of the curved convex protrusion is disposed outside of the control member.

2. The fluid control device according to claim 1, wherein the bonnet defines a through-bore slidably receiving a portion of the control member.

3. The fluid control device according to claim 2, wherein the through-bore in the bonnet includes a packing cavity receiving a packing to seal the control member.

4. The fluid control device according to claim 1, wherein the bonnet defines a seating surface adapted to be sealingly abutted by the control member when the control member is in the second position.

5. The fluid control device according to claim 4, wherein the protrusion defines the seating surface, the protrusion extending at least partially into the valve body.

6. The fluid control device according to claim 4, wherein the control member includes a valve plug slidably disposed in the valve body, the valve plug adapted to sealingly abut the seating surface of the bonnet when the control member is in the second position.

7. The fluid control device according to claim 6, further comprising a cage fixedly disposed within the valve body and slidably guiding the valve plug.

8. The fluid control device according to claim 7, wherein the cage includes at least one cage window for providing for the flow of fluid through the valve body when the control member is in at least the second position.

9. The fluid control device according to claim 7, wherein the valve plug includes a webbed valve plug defining plug openings for providing for the flow of fluid through the valve plug when the control member is in at least the first position.

10. A fluid control device, comprising:
    a valve body defining a flow path for a fluid;
    a bonnet coupled to the valve body and defining a protrusion including a continuously curved convex protrusion, the entirety of the curved convex protrusion being rigid and having a substantially parabolic cross-section, the curved convex protrusion extending into the valve body and at least partially into the flow path and arranged to direct at least some of the fluid flowing along the flow path; and
    a control member disposed in the valve body and adapted for displacement between a first position spaced from the bonnet and a second position sealingly engaging the bonnet, wherein a first portion of the curved convex protrusion is disposed in the control member and a second portion of the curved convex protrusion is disposed outside of the control member when the control member is in the second position.

11. The fluid control device according to claim 10, wherein the bonnet defines a through-bore slidably receiving a portion of the control member.

12. The fluid control device according to claim 11, wherein the through-bore in the bonnet includes a packing cavity receiving a packing to seal the control member.

13. The fluid control device according to claim 10, wherein the protrusion defines a seating surface adapted to be sealingly abutted by the control member when the control member is in the second position.

14. The fluid control device according to claim 13, wherein the control member includes a valve plug slidably disposed in the valve body, the valve plug adapted to sealingly abut the seating surface of the protrusion when the control member is in the second position.

15. The fluid control device according to claim 14, further comprising a cage fixedly disposed within the valve body and slidably guiding the valve plug.

16. The fluid control device according to claim 15, wherein the cage includes at least one cage window for providing for the flow of fluid through the valve body when the control member is in at least the second position.

* * * * *

UNITED STATES PATENT AND TRADEMARK OFFICE
CERTIFICATE OF CORRECTION

PATENT NO. : 7,832,426 B2
APPLICATION NO. : 11/470029
DATED : November 16, 2010
INVENTOR(S) : William E. Wears Page 1 of 1

It is certified that error appears in the above-identified patent and that said Letters Patent is hereby corrected as shown below:

In the Specification:

At Column 1, line 52, "ant" should be -- an --.

At Column 3, line 46, "port ion" should be -- portion --.

Signed and Sealed this
Twelfth Day of July, 2011

David J. Kappos
*Director of the United States Patent and Trademark Office*